United States Patent
Kondo et al.

(10) Patent No.: US 8,339,515 B2
(45) Date of Patent: Dec. 25, 2012

(54) IMAGE SIGNAL GENERATING APPARATUS, IMAGE SIGNAL GENERATING METHOD, AND IMAGE SIGNAL GENERATING PROGRAM

(75) Inventors: Tetsujiro Kondo, Tokyo (JP); Yoshinori Watanabe, Kanagawa (JP); Tsuyoshi Tanaka, Kanagawa (JP); Takuro Ema, Tokyo (JP); Yusuke Akiwa, Saitama (JP)

(73) Assignee: Sony Corporation, Tokyo (JP)

( * ) Notice: Subject to any disclaimer, the term of this patent is extended or adjusted under 35 U.S.C. 154(b) by 1169 days.

(21) Appl. No.: 12/136,328

(22) Filed: Jun. 10, 2008

(65) Prior Publication Data
US 2009/0033795 A1      Feb. 5, 2009

(30) Foreign Application Priority Data
Aug. 2, 2007 (JP) ................. 2007-202252

(51) Int. Cl.
H04N 9/74 (2006.01)
(52) U.S. Cl. ............ 348/588; 348/584; 725/49
(58) Field of Classification Search ............ 725/37–61, 725/131–134, 139–142, 151–153; 348/575–590
See application file for complete search history.

(56) References Cited

U.S. PATENT DOCUMENTS

| | | | |
|---|---|---|---|
| 6,177,931 B1 * | 1/2001 | Alexander et al. | 725/52 |
| 6,581,207 B1 * | 6/2003 | Sumita et al. | 725/46 |
| 6,870,573 B2 * | 3/2005 | Yeo et al. | 348/569 |
| 7,480,701 B2 * | 1/2009 | Smith et al. | 709/217 |
| 7,657,905 B2 * | 2/2010 | Kimoto | 725/44 |
| 7,908,619 B2 * | 3/2011 | Yoshida et al. | 725/46 |
| 8,028,314 B1 * | 9/2011 | Sezan et al. | 725/46 |
| 2003/0101104 A1 | 5/2003 | Dimitrova et al. | |

FOREIGN PATENT DOCUMENTS

| | | |
|---|---|---|
| CN | 1596406 A | 3/2005 |
| CN | 1782984 A | 6/2006 |
| JP | 10-229560 | 8/1998 |
| JP | 2002-135679 | 5/2002 |

OTHER PUBLICATIONS

Japanese Office Action issued May 15, 2012, in Japan Patent Application No. 2007-202252.

* cited by examiner

*Primary Examiner* — Annan Shang
(74) *Attorney, Agent, or Firm* — Oblon, Spivak, McClelland, Maier & Neustadt, L.L.P.

(57) ABSTRACT

Disclosed is an image signal generating apparatus that includes a video information obtaining unit that obtains a plurality of video information, a characteristic information obtaining unit that obtains a plurality of predetermined characteristic information from each of the plurality of video information obtained by the video information obtaining unit, and a sorting unit that changes an order of displaying the plurality of the video information based on each of the plurality of characteristic information obtained from the characteristic information obtaining unit. The image signal generating apparatus further includes a display image signal generating unit that generates a video signal to display the plurality of video information based on information obtained, as a result of changing the order of displaying the plurality of the video information, from the sorting unit.

15 Claims, 16 Drawing Sheets

FIG. 1
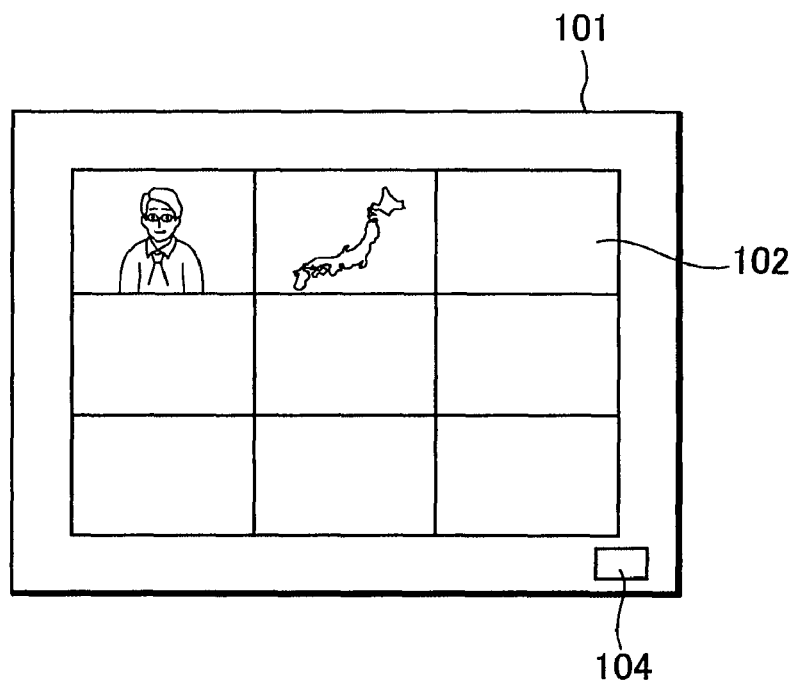
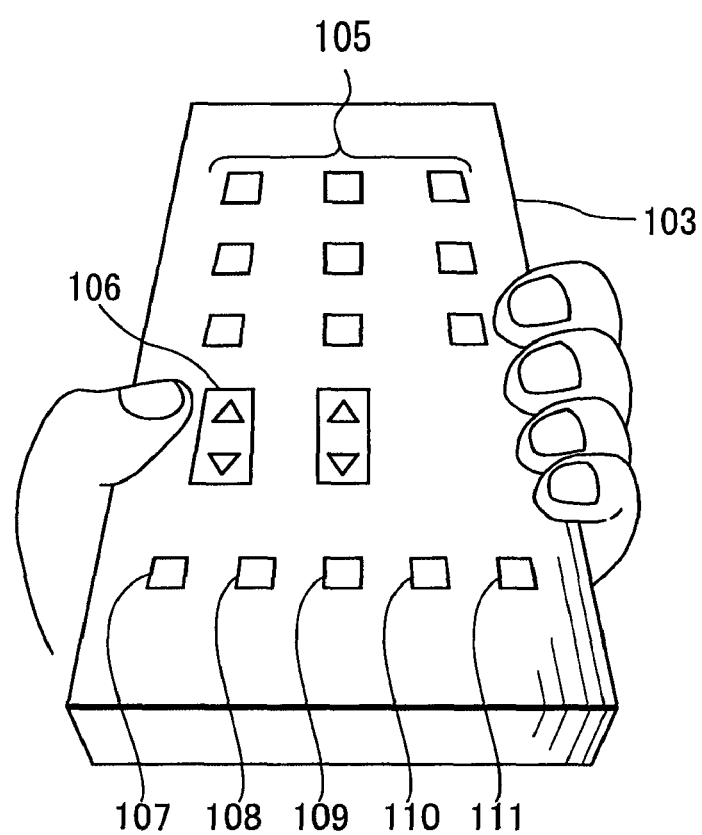

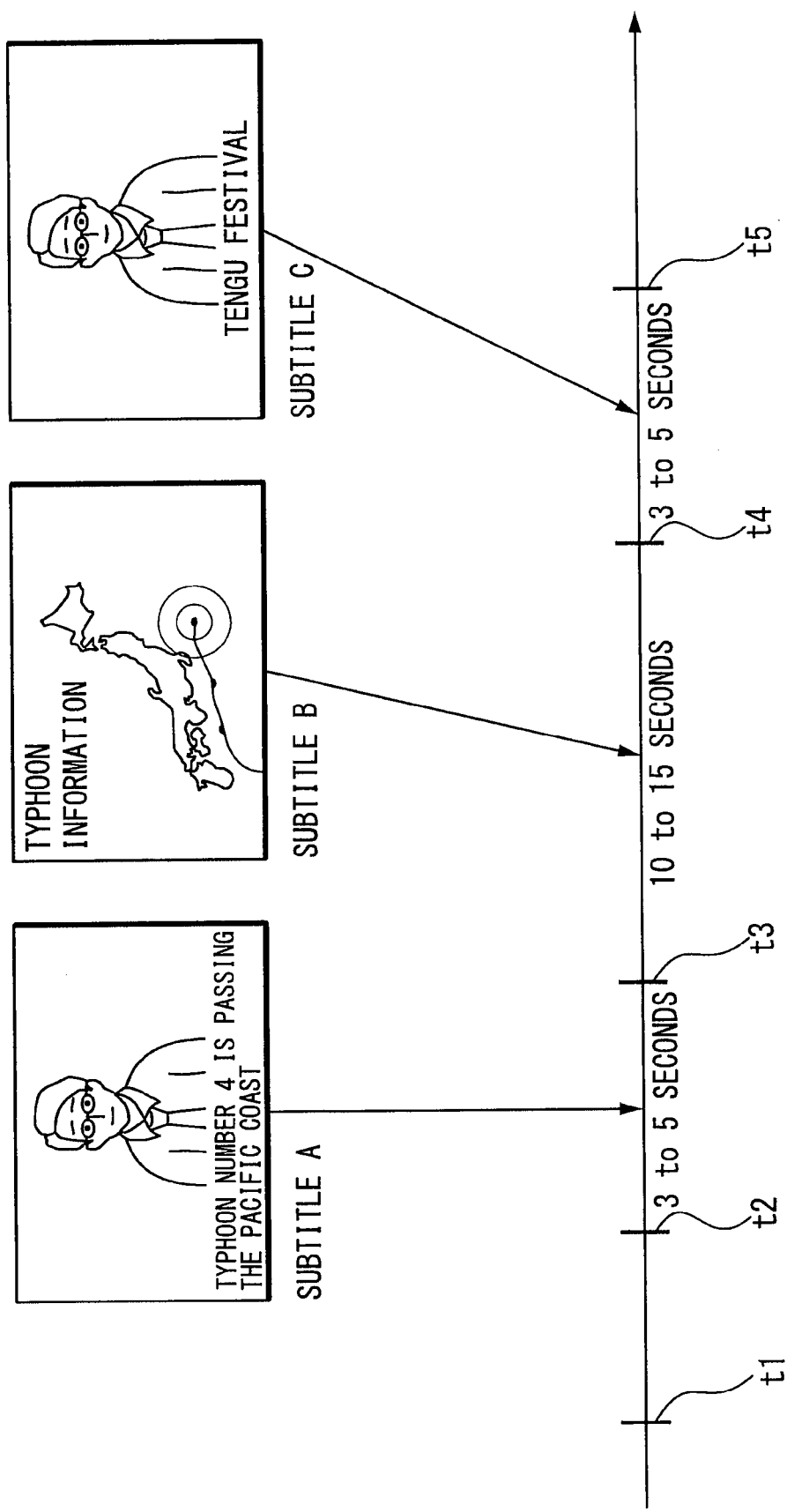

*FIG. 15*

| DATE AND TIME | CHARACTERISTIC |
|---|---|
| 2007. 7. 16  19:00  00 | EPG_NEWS |
| 2007. 7. 16  19:00  00 | SCENE_CHANGE |
| 2007. 7. 16  19:02  00 | SUBTITLE |
| 2007. 7. 16  19:02  00 | TOPICS |
| 2007. 7. 16  19:07  00 | SCENE_CHANGE |
| 2007. 7. 16  19:07  00 | SUBTITLE |
| 2007. 7. 16  19:17  00 | SCENE_CHANGE |
| 2007. 7. 16  19:17  00 | SUBTITLE |
| 2007. 7. 16  19:17  00 | TOPICS |

206

IMAGE SIGNAL GENERATING APPARATUS, IMAGE SIGNAL GENERATING METHOD, AND IMAGE SIGNAL GENERATING PROGRAM

CROSS REFERENCES TO RELATED APPLICATIONS

The present invention contains subject matter related to Japanese Patent Application JP 2007-202252 filed in the Japanese Patent Office on Aug. 2, 2007, the entire contents of which being incorporated herein by reference.

BACKGROUND OF THE INVENTION

1. Field of the Invention

The present invention relates to an image signal generating apparatus, an image signal generating method, and an image signal generating program. In more detail, the present invention relates to a technology applied to displaying a multiscreen on an image display apparatus such as a television receiver.

2. Description of the Related Art

Many current television receivers generally include a multiscreen display function where the screen is divided and the video currently being received on each channel is displayed in order of the channel numbers from top left to bottom right. The user can have such multiscreen displayed and select a desired program. Japanese Unexamined Patent Application Publication No. H10-229560 discloses one example of a typical multiscreen display technology.

SUMMARY OF THE INVENTION

Most of related art multiscreen displays merely display the channels in order, and there seem few technologies for sorting the channels in accordance with the user's preferences. This means that to find channels that are broadcasting programs that the user likes, the user has to visually scan through every channel that is displayed on the multiscreen. Note that although an example has been described where television broadcasts are viewed on a television receiver, even when a multiscreen is displayed on an image display apparatus aside from a television receiver, the user still has to visually scan through every channel that is displayed on the multiscreen when displaying the various screens that forms the multiscreen.

The present invention is conceived in view of the subject-matter described above and intends to provide a multiscreen that can display in accordance with the user's preferences.

An embodiment of the present invention is applied to generating a video signal for displaying a plurality of contents each including video information, as a multiscreen. The processing content is as follows. Video information of a plurality of contents is obtained and various characteristic information is obtained from the plurality of video information. After this, an order of the video information is changed based on the obtained plurality of characteristic information. Display positions of the plurality of video information are then laid out based on the changed order of the video information to generate a video signal to be displayed on a display apparatus.

Characteristic information is obtained from the video information. Based on this information, contents such as channels are sorted and the layout of contents in a multiscreen is determined.

According to the present invention, a multiscreen can be displayed with a variety of orders in accordance with the user's preferences. As one example, when the present invention is applied to a television receiver, it is possible to favorably lay out channels in a multiscreen for displaying many channels.

BRIEF DESCRIPTION OF THE DRAWINGS

FIG. 1 is a schematic diagram of a television receiver and an infrared remote controller for operating the same according to an embodiment of the present invention;

FIG. 7 is a diagram showing one example of subtitles appearing in a program;

FIG. 15 is a diagram showing one example of a characteristic amount table;

DESCRIPTION OF THE PREFERRED EMBODIMENTS

Figure 2:
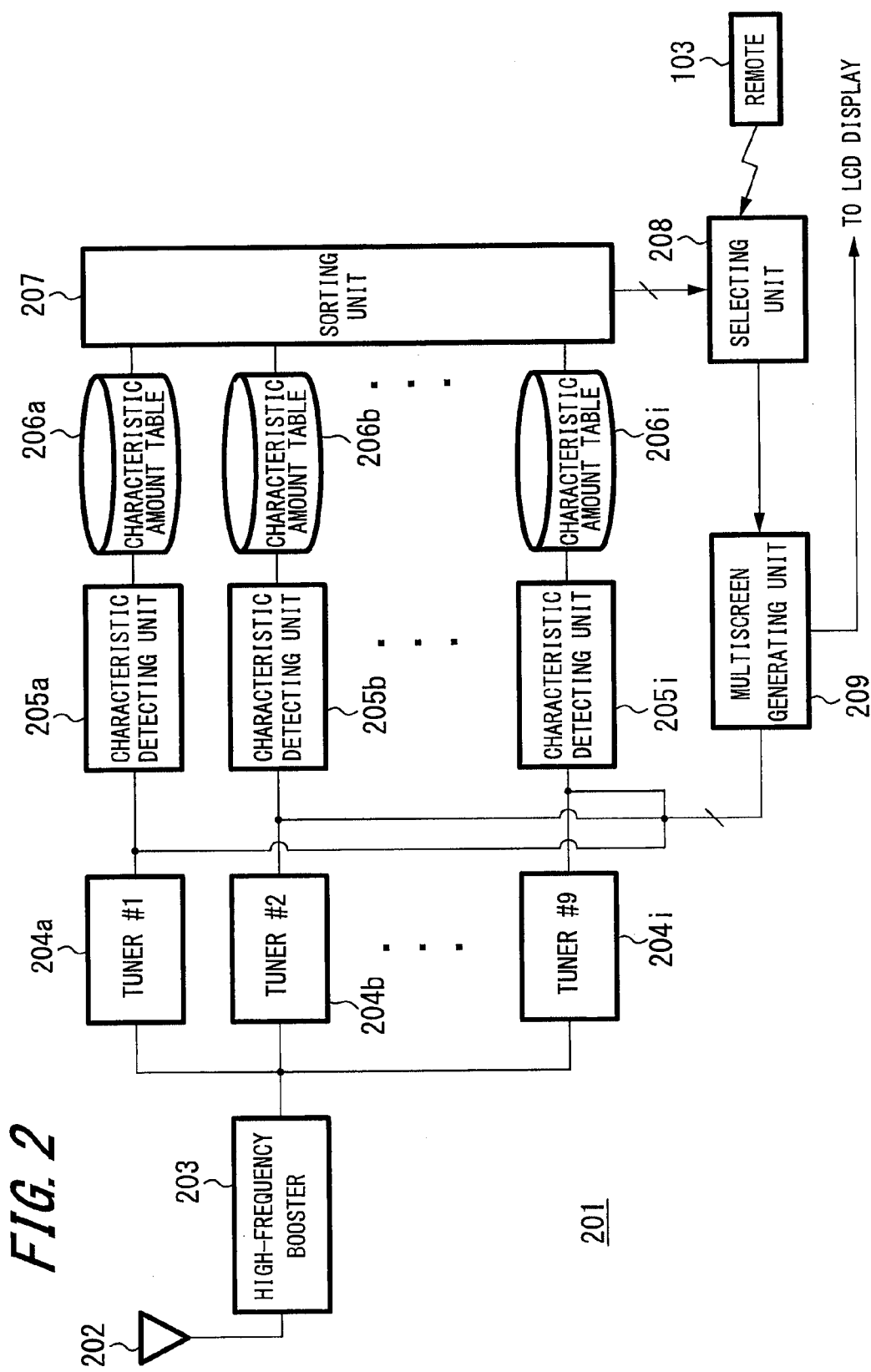
FIG. 2 is a functional block diagram of the television receiver.

Preferred embodiments of the present invention will now be described with reference to FIG. 1 to FIG. 17.

FIG. 1 is a schematic diagram of a television receiver (hereinafter simply "tv") 101 and an infrared (IR) remote controller (hereinafter simply "remote") 103 for operating the tv 101. The tv 101 includes an LCD display 102 that forms a display unit, and an IR receiver unit 104 that receives IR signals emitted by the remote 103. A multiscreen that is a function according to the present embodiment is displayed on the LCD display 102. Here, a "multiscreen" is a display configuration where the LCD display 102 is divided into a predetermined number of regions and the respective contents of received channels are displayed in such regions.

The remote 103 is provided with channel buttons 105 for switching between the received channels, volume buttons 106 for adjusting the volume, and also a channel list display button 107 for displaying the multiscreen described above that is the function according to the present embodiment. The display order of the multiscreen runs from the left to the right of the screen and from the top to the bottom. On the remote 103, buttons for changing the order in which the multiscreen is displayed are aligned to the right of the channel list display button 107. The "category order" button 108 is used to display channels in order of program categories given in an EPG (Electronic Program Guide). When this button is pressed, the channels are sorted into program categories included in the EPG and the received channels are aligned from the top left to the bottom right of the multiscreen in order of the categories. A "subtitle frequency" button 109 is used to display channels in order of the appearance frequency of subtitles (i.e., on-screen text) that appear in programs. When this button is pressed, the channels are sorted after converting the total number of subtitles displayed in a program to an appearance frequency per unit time and the received channels are aligned and displayed in the multiscreen from top left to bottom right in order of the appearance frequency of the subtitles. A "scene change" button 110 is used to display the channels in order of the frequency of scene changes that occur during the present program. When this button is pressed, the channels are sorted after converting the total number of "scene changes", that is, when there is a large change in the display content on the screen, that occur in the program to an appearance frequency per unit time and the received channels are aligned and displayed in the multiscreen from top left to bottom right in order of the appearance frequency of the scene changes. A "topic frequency" button 111 is used to display the channels in order of the appearance frequency of topic screens that appear during the present program. When this button is pressed, the channels are sorted after converting the total number of topics that appear in the program to an appearance frequency per unit time and the received channels are aligned and displayed in the multiscreen from top left to bottom right in order of the appearance frequency of the topics.

The concept of "topics" will now be described for the example of a news program. A news program is divided into two patterns that are (1) scenes with a background that is normally fixed and usually the same newsreader reading the news and (2) scenes with on-location video images that depict the current news topic in more detail. Out of these, the former scenes where the newsreader reads the news are the same every time, and there will be little difference in such scenes for the same news program even on different days. Out of such scenes, scenes that follow immediately after a scene change are called "topics". Based on this definition, a program having a predetermined opening or the like that is broadcast every day or on the same day every week can be regarded as a program with this kind of topic screen such as a news program.

FIG. 2 is a functional block diagram of a tuner unit of a tv. After broadcast waves received from an antenna 202 have been amplified by a high-frequency booster 203, the waves are demodulated by nine tuners, i.e., "tuner #1" 204a, "tuner #2" 204b, ..., "tuner #9" 204i for each broadcast channel to generate digital video signals. The digital video signals of the respective channels are inputted into characteristic detecting units 205a, 205b, ..., 205i provided for the respective channels. The characteristic detecting units 205a, 205b, ..., 205i (which can also be referred to as a "characteristic information obtaining unit") record characteristic amount data that has been detected in characteristic amount tables 206a, 206b, ..., 206i. The characteristic amount tables 206a, 206b, ..., 206i are files provided in non-volatile storage, not shown, and are in the form of tables. A sorting unit 207 reads the characteristic amount tables 206a, 206b, ..., 206i and carries out sorting for the various characteristic amount data therein. A selecting unit 208 selects channel order data generated by the sorting unit 207 in accordance with an instruction from the remote 103.

The channel order data implies an order of displaying the plurality of the video information selected that can be changed based on each of the plurality of characteristic information. The channel order data selected according to the instruction from the remote 103 is inputted via the selecting unit 208 into a multiscreen generating unit 209. The multiscreen generating unit 209 (which can also be referred to as a "display image signal generating unit") receives the digital video signals for each channel simultaneously, generates a digital video signal for a multiscreen in accordance with the channel order data, and sends the multiscreen digital video signal to the LCD display 102.

A tuner unit 201 in FIG. 2 (which can also be referred to as a "video signal generating apparatus") receives television broadcasts and generates a multiscreen in real time.

Figure 3:
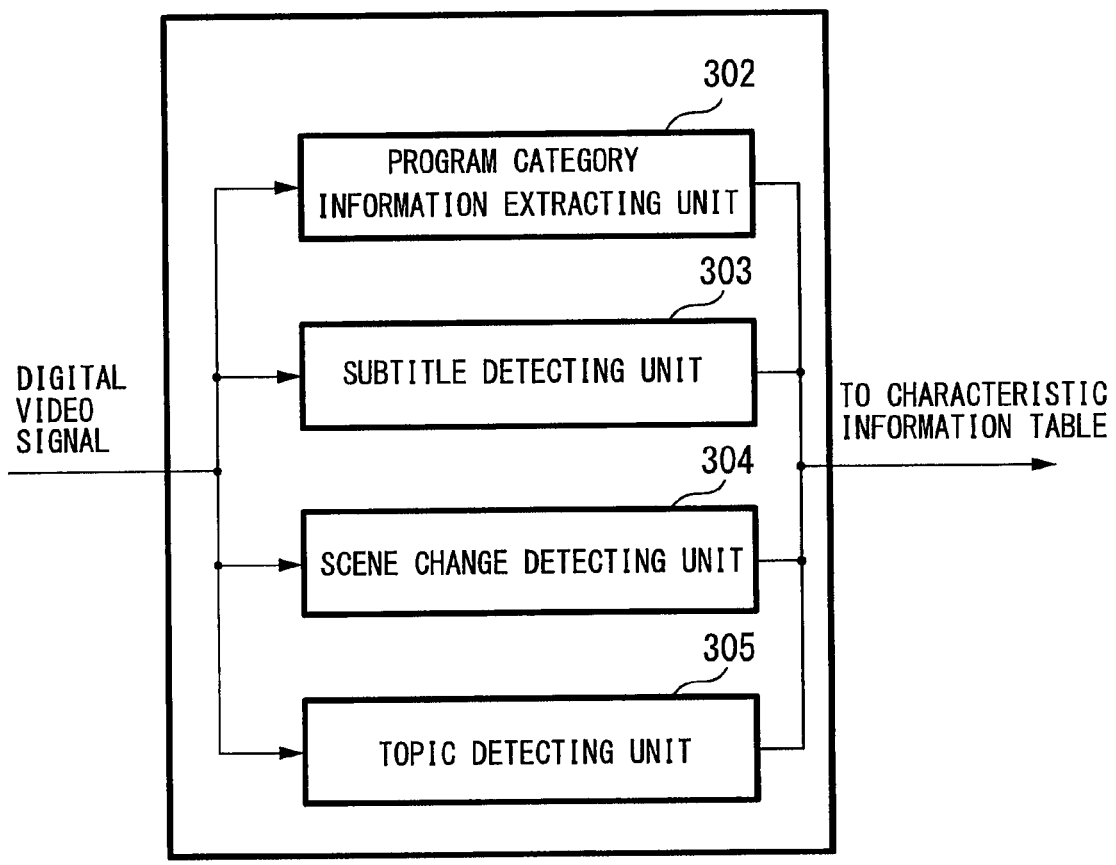
FIG. 3 is a functional block diagram of a characteristic detecting unit.

FIG. 3 is a functional block diagram of one of the characteristic detecting units 205. A program category information extracting unit 302 extracts information showing the category of a program from an EPG and outputs such information. A subtitle detecting unit 303 detects whether any subtitles are present in a digital video signal and, when a subtitle is found, outputs information showing that a subtitle has been found. A scene change detecting unit 304 detects scene changes in the digital video signals and outputs information showing such scene changes. A topic detecting unit 305 detects the appearance of topics in the digital video signals and outputs information showing such topics. These functional blocks correspond to the buttons of the remote 103 described earlier.

Figure 4:
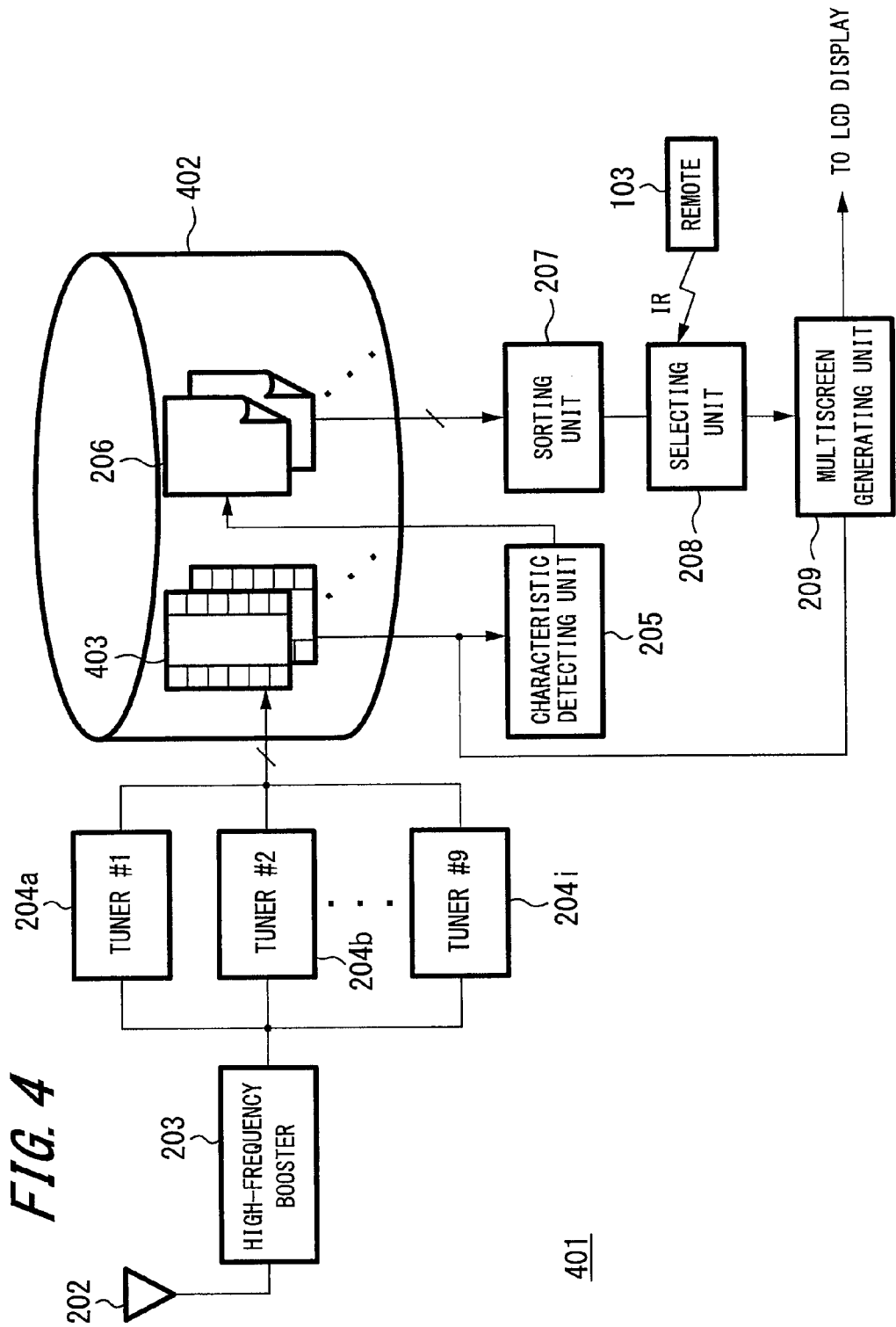
FIG. 4 is a functional block diagram of a television receiver according to another specific example of the present embodiment.

FIG. 4 is a functional block diagram of a recording apparatus that is another specific example of the present embodiment. After the broadcast waves from the antenna 202 have been amplified by the high-frequency booster 203, the nine tuners, that is, "tuner #1" 204a, "tuner #2" 204b, ..., "tuner #9" 204i for the respective broadcast channels demodulate the amplified waves to generate the digital video signals. The digital video signals of the respective channels are stored as video files 403 for the respective programs in a non-volatile storage 402, which is formed of a well-known hard disk apparatus, based on EPG information demodulated from the received waves. The characteristic amount detecting unit 205 reads these video files and generates characteristic amount tables 206 that include separate files for each video file. That is, one video file 403 is generated for one program and based on this, a characteristic amount table 206, which is also a single file, is generated. The sorting unit 207 reads the respective characteristic amount tables 206 and carries out sorting for the various characteristic amount data therein. The selecting unit 208 selects channel order data generated by the sorting unit 207 in accordance with an instruction from the remote 103. The channel order data selected in accordance with the instruction from the remote 103 is inputted into the multiscreen generating unit 209 via the selecting unit 208. The multiscreen generating unit 209 simultaneously receives the digital video signals for each channel, generates a multiscreen digital video signal in accordance with the channel order data, and sends the multiscreen digital video signal to the LCD display 102.

A recording apparatus 401 shown in FIG. 4 (which can also be referred to as a "video signal generating apparatus") differs from the tuner unit 201 shown in FIG. 2 in that although the tuner unit 201 shown in FIG. 2 is only equipped with a receiving function, the recording apparatus 401 shown in FIG. 4 is equipped with a so-called "hard disk recorder"

recording function. Also, the characteristic amount detecting unit 205 that is provided separately for each channel in the tuner unit 201 shown in FIG. 2 is a single unit in the recording apparatus 401. This is because although the tuner unit 201 shown in FIG. 2 carries out an operation that detects the characteristic amounts for the digital video signals received by the tuner unit 201 in real time, in the recording apparatus 401 shown in FIG. 4, the programs are already recorded and the characteristic amount tables 206 are generated after the broadcasts by reading the video files 403 that have been stored in the non-volatile storage 402. That is, although the recording apparatus 401 shown in FIG. 4 does not display a multiscreen in real time while broadcasts are being received, it is possible to carry out the sorting of programs over time.

To realize a sorting function for programs over time, an instruction designating the programs to be sorted is generated by the remote 103 and the selecting unit 208 transmits the received instruction to the sorting unit 207. The sorting unit 207 sorts the programs selected to be sorted. As the method of selecting the programs to be sorted, a variety of terms can be used to narrow the search, such as a method that designates programs that have been broadcast in a period between predetermined dates, a method that selects a program category given by an EPG, and a method that designates a predetermined channel. It is also common for the number of programs to be sorted to exceed the number of regions in a multiscreen. In this case, by displaying a plurality of multiscreens, it is possible to display the entire sorting result. That is, to realize a multiple display function for multiscreens, keys used for such purpose need to be provided on the remote 103. As one example, left and right arrow keys may be provided.

Although the constructions are slightly different in FIG. 2 and FIG. 4, the operation of the characteristic amount extracting units and the fundamental display states of multiscreens are completely the same.

Subtitle Detection

Figure 5:
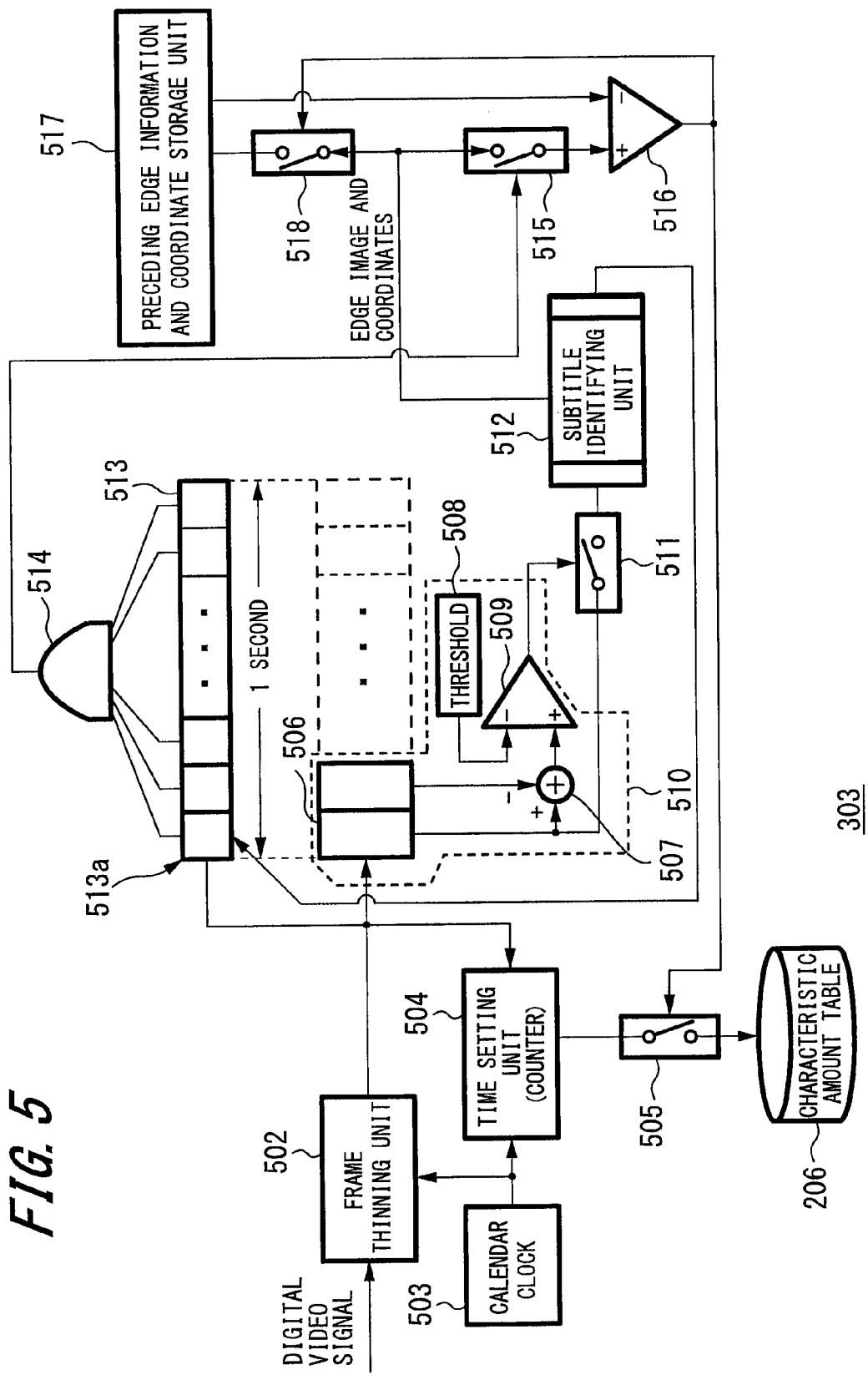
FIG. 5 is a functional block diagram of a subtitle detecting unit.

A subtitle detecting function will now be described with reference to FIG. 5 to FIG. 9. FIG. 5 is a functional block diagram of a subtitle detecting unit 303 that forms part of the characteristic amount detecting unit 205. The majority of this function is effectively realized by a program of a microcomputer. The data amount of each digital video signal is reduced by a frame thinning unit 502. Since high-resolution video signals include an extremely large amount of data, if such video signals are left unchanged, subtitle detection, and the scene change detection and topic detection described later will be very time-consuming. Accordingly, it is possible to improve the real time response of the characteristic amount detection process by reducing the amount of data in advance. As measures that reduce the amount of data, it is possible to skip frames, such as by reducing the frame rate to around ten frames per second, and to lower the resolution and reduce the amount of data in each frame. The frame thinning unit 502 carries out both of such measures.

A calendar clock 503 is a well-known IC that outputs time/date information and is provided in a large number of microcomputers and almost all personal computers. A time setting unit 504 composed of a counter provides time/date information in msec (millisecond) units for each frame in the digital video signal outputted from the frame thinning unit 502 and outputs the time/date information. The outputted time/date information is recorded in the characteristic amount table 206 for the digital video signal via a switch 505. Each frame in the digital video signal is temporarily recorded in the frame buffers 506 as digital video data (hereinafter simply "video data"). The frame buffers 506 have a two-frame capacity. That is, the immediately preceding frame and the present frame are stored. Difference data for the video data inside the frame buffers 506 is generated by an adder. The difference data is inputted into a comparator 509 together with a threshold 508, and is compared with the threshold 508. The output of the comparator 509 is a video judgment result. Here, it is judged whether the images are moving images based on the difference between the frame buffers 506. The frame buffers 506, the adder 507, the threshold 508, and the comparator 509 described above construct a video judging unit 510.

The output of the comparator 509 that is the video judgment result controls a switch 511. When it is judged that the images are moving images, the switch 511 is switched on. The switch 511 is connected to a present frame part of the frame buffers 506 so that the video data therein is outputted via the switch 511 to a subtitle identifying unit 512. The subtitle identifying unit 512 analyzes the video data of the present frame that has been provided and outputs an indication of whether a subtitle is present, an edge image that constructs the subtitle, and coordinate information thereof.

The judgment result of whether a subtitle is present that has been outputted by the subtitle identifying unit 512 is provided to a region 513a of a flag variable array 513 that shows the present frame. The flag variable array 513 includes variables provided inside a RAM by a program and is an array variable including a number of elements corresponding to the number of frames in one second of a digital video signal that has been thinned by the frame thinning unit 502. As one example, ten elements are included in the present embodiment. The content of the flag variable array 513 is shifted by one element whenever there is a change of frame in the digital video signal. FIG. 5 shows how video data is stored in each frame in the frame buffers 506 and the elements of the flag variable array 513 are depicted alongside the frame buffers 506 to show the correspondence therebetween.

The respective elements of the flag variable array 513 each store a flag showing whether a subtitle is included in the corresponding frame. If a subtitle is included, the value "1" indicating "true" is stored and if no subtitle is included, the value "0" indicating "false" is stored. An AND gate 514 is connected to the respective elements of the flag variable array 513 and when all of the elements of the flag variable array 513 are "true", that is, when the presence of a subtitle in the video data continues for one second or longer, the AND gate 514 outputs "true".

The output of the AND gate 514 controls a switch 515. The switch 515 outputs the present edge image and the coordinate information thereof that are outputted from the subtitle identifying unit 512 to a comparator 516. The comparator 516 compares the outputted information with a "preceding edge information and coordinate" storage unit 517 stored in the RAM and outputs a judgment result showing whether both relate to the same subtitle. When the comparator 516 judges that the subtitles are different, this judgment result controls a switch 518 and the present edge image and the coordinate information thereof outputted from the subtitle identifying unit 512 are written into the "preceding edge information and coordinate" storage unit 517. A switch 505 is also controlled and date/time information of the present frame is stored in the characteristic amount table 206.

Figure 6A:
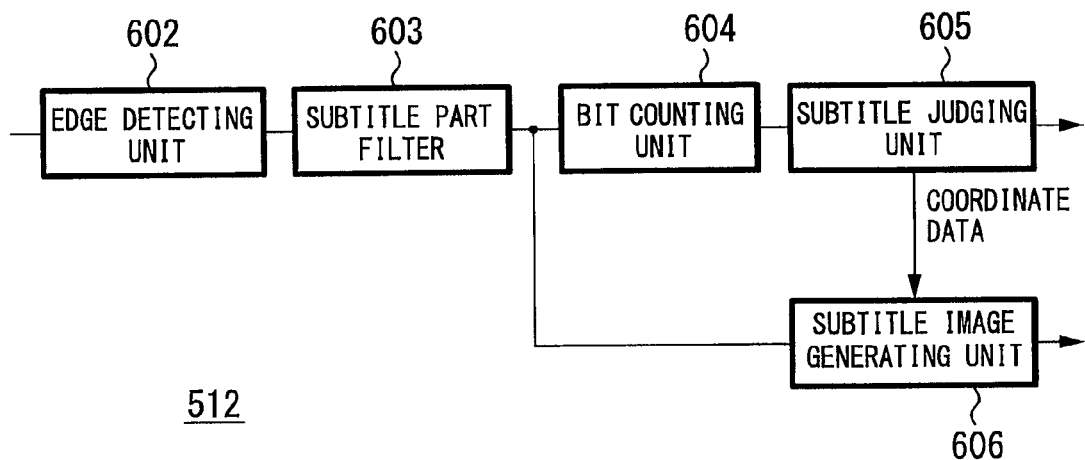
FIGS. 6A and 6B are respectively a block diagram of a subtitle identifying unit and a schematic diagram useful in explaining the function of a subtitle part filter.
Figure 6B:
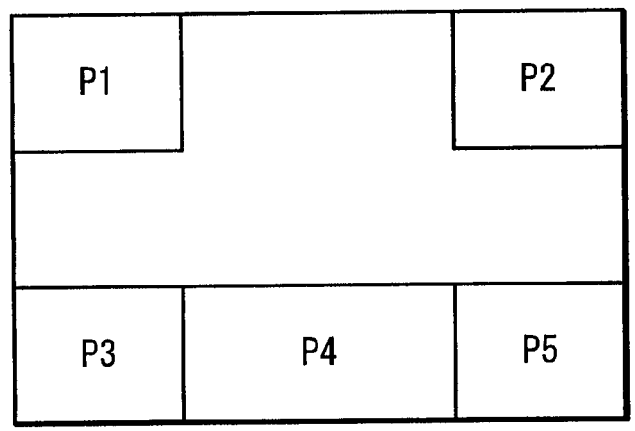

FIGS. 6A and 6B are respectively a block diagram of the subtitle identifying unit 512 and a schematic diagram useful in explaining the function of a subtitle part filter. An edge detecting unit 602 detects edges from the video data of one frame. Here, an "edge" refers to a part where there is a sudden change in the image data. As examples, when a bright part and a dark part are adjacent or when red and blue are adjacent, the boundary line therebetween is an edge. That is, in most cases, characters are expressed by such edges. Since a subtitle is mainly composed of a character string, it is essential to carry out edge detection. For an edge image obtained from the edge detecting unit 602, a subtitle part filter 603 divides and outputs parts of the image where there is a high probability of a subtitle appearing. The parts where there is a high probability of a subtitle appearing in the image are shown in FIG. 6B. In a news program or the like, in many cases, subtitles hardly ever appear in the center of the screen and instead normally appear at top right, top left, bottom right, bottom left, or bottom center of the screen. The subtitle part filter 603 divides the edge image into the five regions described above and outputs the result.

A bit counting unit 604 counts the number of bits that construct an edge image present in the respective regions outputted by the subtitle part filter 603. A subtitle judging unit 605 compares the number of bits outputted by the bit counting unit 604 to the predetermined threshold 508 to judge whether a subtitle is present in the five regions, and outputs a judgment result together with region information that shows the coordinate data. A subtitle image generating unit 606 selects a region including a subtitle from the subtitle part filter 603 based on coordinate data produced by the subtitle judging unit 605, that is, based on the region information, and outputs to the periphery.

FIG. 7 is a diagram showing one example where a subtitle appears in a program. At time t1, a news program starts. At time t2, the newsreader starts to read the first news item. At this time, the upper body of the newsreader is shown in closeup on the screen and the characters "Typhoon Number 4 is Passing the Pacific Coast" are displayed as subtitle A in the bottom center of the screen. This state continues for around three to five seconds. At time t3, the scene changes. A map of Japan is displayed in the center of the screen and the characters "Typhoon Information" are displayed as subtitle B at the top left of the screen. This state continues for around ten to fifteen seconds. At time t4, the newsreader starts to read the next news item. At this time, the upper body of the newsreader is again shown in closeup on the screen and the characters "Tengu Festival" are displayed as subtitle C in the bottom center of the screen. This state continues for around three to five seconds.

As shown in the example described above, it is possible to display subtitles for units of several seconds in the periphery of images. Accordingly, to detect a subtitle, it is necessary to detect whether the characteristics of an image thought to be a subtitle continue for a certain period or longer and whether the characteristics of an image that has appeared differ to characteristics of the preceding image.

The operation of the subtitle detecting unit 303 shown in FIG. 5 will now be described with reference to FIG. 7. When one second has elapsed from t2 when the subtitle A appears, all of the elements of the flag variable array 513 become "true", and since the "preceding edge information and coordinate" storage unit 517 is empty, the comparison result of the comparator 516 is "true". Next, an indication that a subtitle has been detected at this time is written in the characteristic amount table 206 and "P4" that is the edge image and coordinate data of the subtitle A is written in the "preceding edge information and coordinate" storage unit 517. From this point until the time t3 is reached, the comparison result of the comparator 516 is "false". Since in most cases, the displaying of a subtitle ends when one news item finishes, "false" is included in the elements of the flag variable array 513 and the apparatus then waits until the next subtitle has been displayed for one second or longer. When one second has passed from the time t3 where the subtitle B appears, all of the elements in the flag variable array 513 become "true". Since the subtitle A is stored in the "preceding edge information and coordinate" storage unit 517, the detection of a subtitle at this time is written into the characteristic amount table 206 and "P1" that is the edge image and coordinate data of the subtitle B is written in the "preceding edge information and coordinate" storage unit 517. From this point until the time t4 is reached, the comparison result of the comparator 516 is "false".

As described above, subtitles included in video are detected by the subtitle detecting unit 303 and are successively stored in the characteristic amount table 206.

Figure 8:
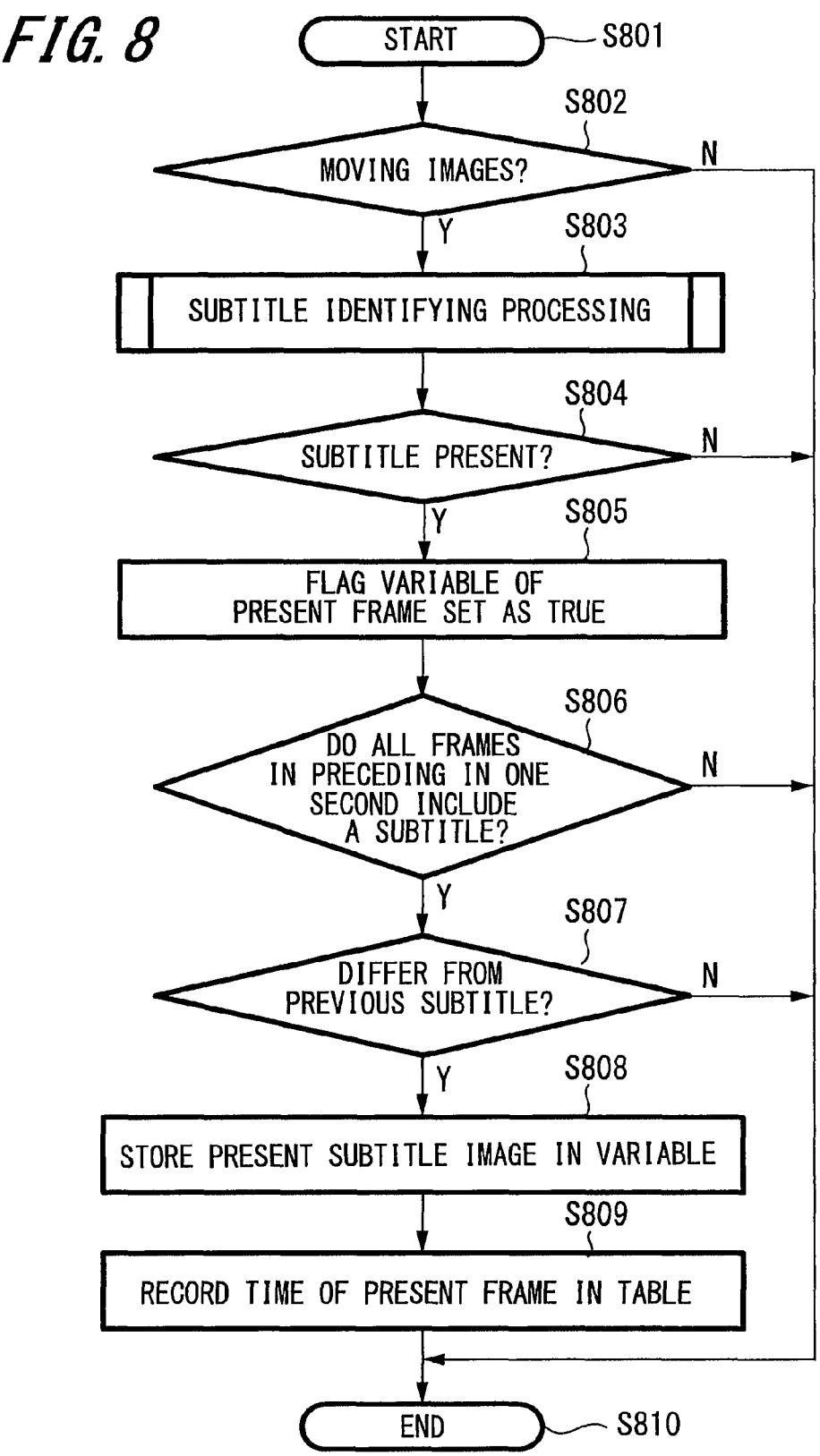
FIG. 8 is a flowchart showing the operation of the subtitle detecting unit.

FIG. 8 is a flowchart showing the operation of the subtitle detecting unit 303. This processing is carried out whenever frames that have been thinned by the frame thinning unit 502 are outputted. When the frame thinning unit 502 outputs one frame of video data (S801), the video judging unit 510 compares the present frame with the preceding frame of video data and judges whether the images are moving images (S802). When the images are moving images, a subtitle identifying process is carried out by the subtitle identifying unit 512 (S803). When the subtitle identifying unit 512 has judged that a subtitle is present (S804), due to such judgment result, the element in the flag variable array 513 that indicates the present frame is set at "true" (S805).

Next, the AND gate 514 detects whether a subtitle has been detected in all of the frames in the preceding one second period (S806). When the AND gate 514 outputs "true", the comparator 516 compares the edge image and coordinate information of the present frame and the preceding edge image and coordinate information stored in the "preceding edge information and coordinate" storage unit 517 (S807). If the result of the comparison is that there are differences between the edge image and coordinate information in the present frame and the preceding edge image and coordinate information, the edge image and coordinate information of the present frame are stored in the "preceding edge information and coordinate" storage unit 517 (S808). In addition, time/date information of the present frame is recorded in the characteristic amount table 206 (S809) and the processing is completed (S810). Note that when the judgment result is "false" in any of steps S802, S804, S806, and S807, no further processing is carried out. That is, the operations in steps S808 and S809 are not carried out.

Figure 9:
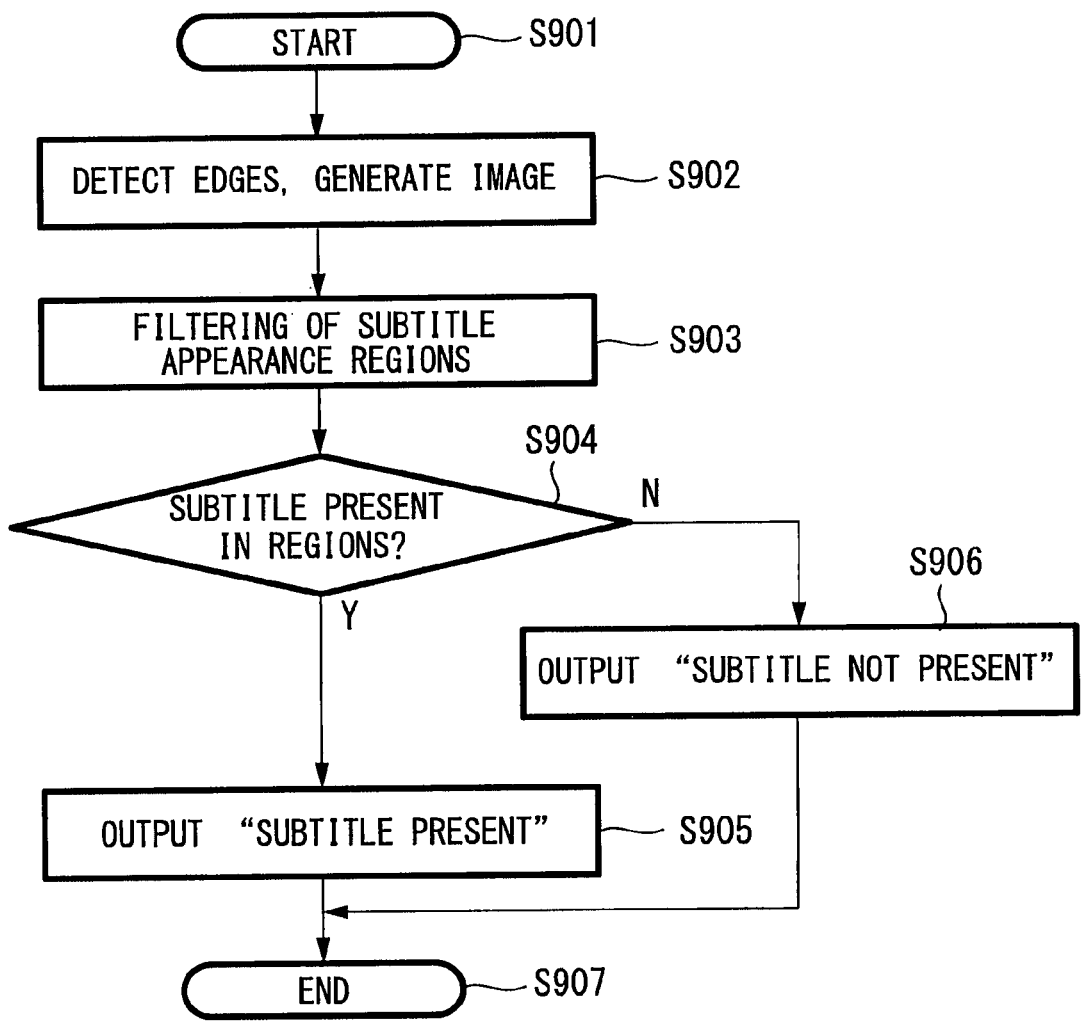
FIG. 9 is a flowchart showing the operation of a subtitle identifying unit.

FIG. 9 is a flowchart showing the operation of the subtitle identifying unit 512. This operation corresponds to the content of step S803 in FIG. 8. When the processing starts (S901), the edge detecting unit 602 detects edges from the video data of the present frame that has been inputted to generate an edge image (S902). Filtering is then carried out on the generated edge image by the subtitle part filter 603 (S903). Next, the subtitle judging unit 605 receives the bit counting results for the edge images in each region that have been outputted from the bit counting unit 604 and judges whether a subtitle is present in any of the five regions (S904). When it is judged that a subtitle is present, "true" that indicates that "a subtitle is present" is outputted by the subtitle judging unit 605 and the subtitle image is outputted by the subtitle image generating unit 606 (S905). When it is judged that no subtitle is present, "false" that indicates that "no subtitle is present" is outputted by the subtitle judging unit 605 (S906). After this, the processing is completed (S907).

Scene Change Detection

Figure 10:
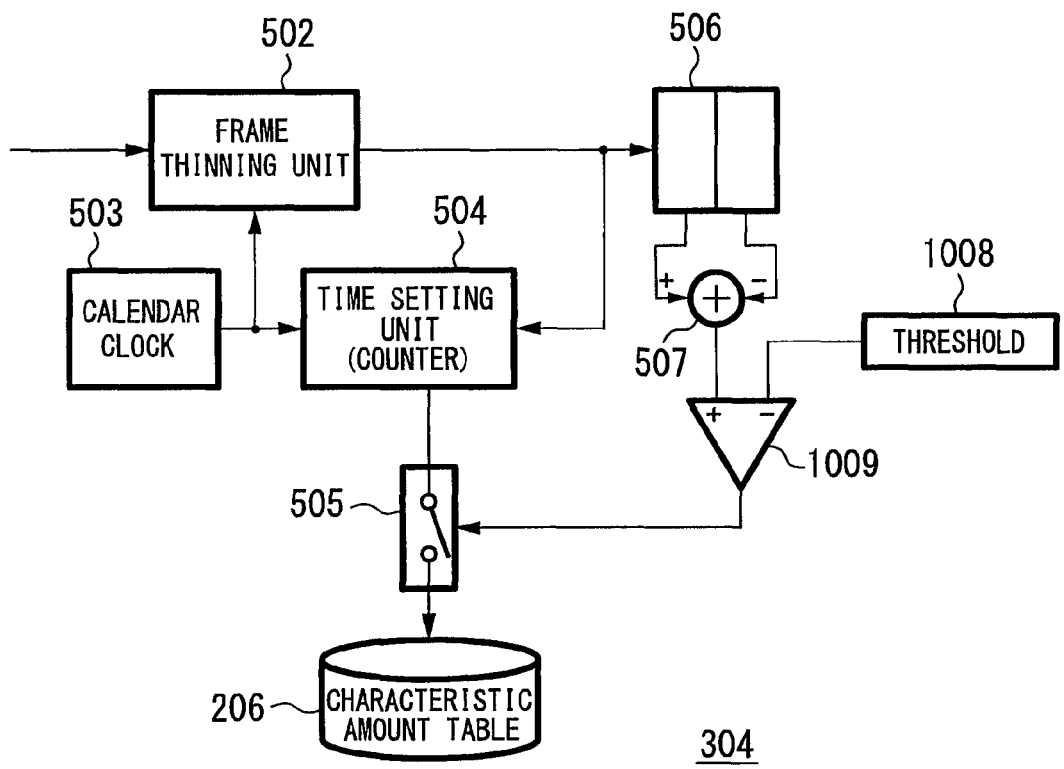
FIG. 10 is a functional block diagram of a scene change detecting unit.

Next, the scene change detecting function will be described using FIG. 10 and FIG. 11. FIG. 10 is a functional block diagram of the scene change detecting unit 304 that forms part of the characteristic amount detecting unit 205. The majority of this function is effectively realized by a program of a microcomputer. Note that description is omitted for parts that are the same as in FIG. 5.

The frame buffers 506 have a two-frame capacity. That is, the preceding frame and the present frame are stored. The adder 507 generates the difference data between the video data in the preceding frame and that in the present frame inside the frame buffers 506. The difference data is inputted into a comparator 1009 together with a threshold 1008, and is compared with the threshold 1008. The output of the comparator 1009 is a scene change judgment result. Here, it is judged whether there is a large change in the image by looking at the difference between the frame buffers 506. When, as a result of the judgment result of the comparator 1009, a scene change has been identified, the comparator 1009 carries out control to switch on the switch 505 and time information for the present frame and the like is written into the characteristic amount table 206.

Figure 11:
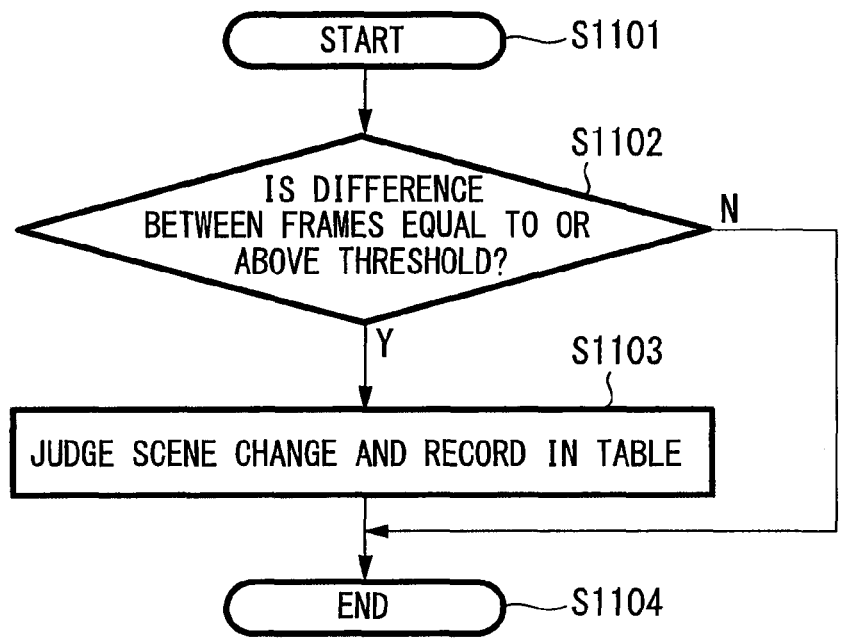
FIG. 11 is a flowchart showing the operation of the scene change detecting unit.

FIG. 11 is a flowchart showing the operation of the scene change detecting unit 304. This processing is carried out whenever frames that have been thinned by the frame thinning unit 502 are outputted. When the frame thinning unit 502 outputs one frame of video data (S1101), the adder 507 outputs the difference between the video data in the present frame and the preceding frame. The comparator 1009 compares the difference data with the threshold 1008, and judges whether the difference is equal to or above the threshold 1008, that is, whether a large change (a so-called "scene change") has occurred on the screen (S1102). If it is judged that a scene change has occurred, time/date information of the present frame is recorded in the characteristic amount table 206 (S1103), and the processing is completed (S1104).

Topic Detection

Figure 12:
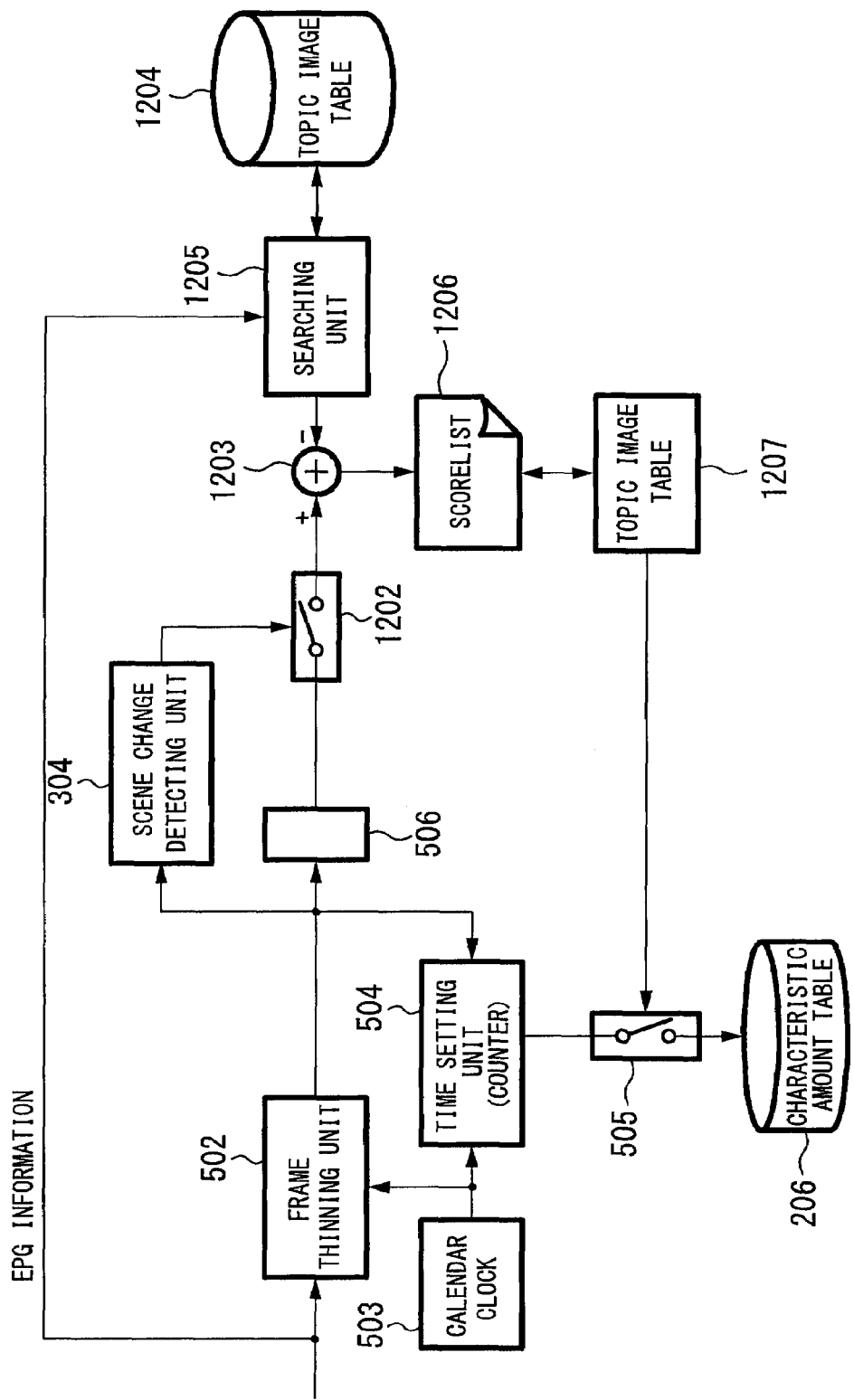
FIG. 12 is a functional block diagram of a topic detecting unit.

A topic detecting function will now be described with reference to FIG. 12 to FIG. 14. FIG. 12 is a functional block diagram of the topic detecting unit 305 that forms part of the characteristic amount detecting unit 205. The majority of this function is effectively realized by a program of a microcomputer. Note that description is omitted for parts that are the same as in FIG. 5.

The video data outputted from the frame thinning unit 502 is temporarily stored in the frame buffers 506 and scene detection is carried out by the scene change detecting unit 304. The scene detecting unit is the same as that described above with reference to FIG. 10. Video data of the present frame is stored in the frame buffers 506. The scene detection result of the scene detecting unit controls a switch 1202 connected subsequently to the frame buffers 506. When a scene change occurs, the switch 1202 is controlled to switch on and the video data of the present frame is inputted into an adder 1203 connected subsequently to the switch 1202.

Here, topic image data found by a searching unit 1205 from a topic image table 1204 is inputted into the other input of the adder 1203. That is, the adder 1203 finds the difference between still images. The searching unit 1205 carries out a search of the topic image table 1204 included in EPG information included in a digital video signal before input into the frame thinning unit 502 with channel information as a search key. Information on the differences between the still images that is outputted by the adder 1203 is successively recorded in a scorelist 1206 as scalar values. The scorelist 1206 is a small file provided in the non-volatile storage 402. A topic judging unit 1207 compares the scores of the topic image data recorded in the scorelist 1206 and for images where the difference is extremely small, judges that a topic has appeared, carries out control to switch on the switch 1202, and additionally records new time/date information in the characteristic amount table 206.

Figure 13:
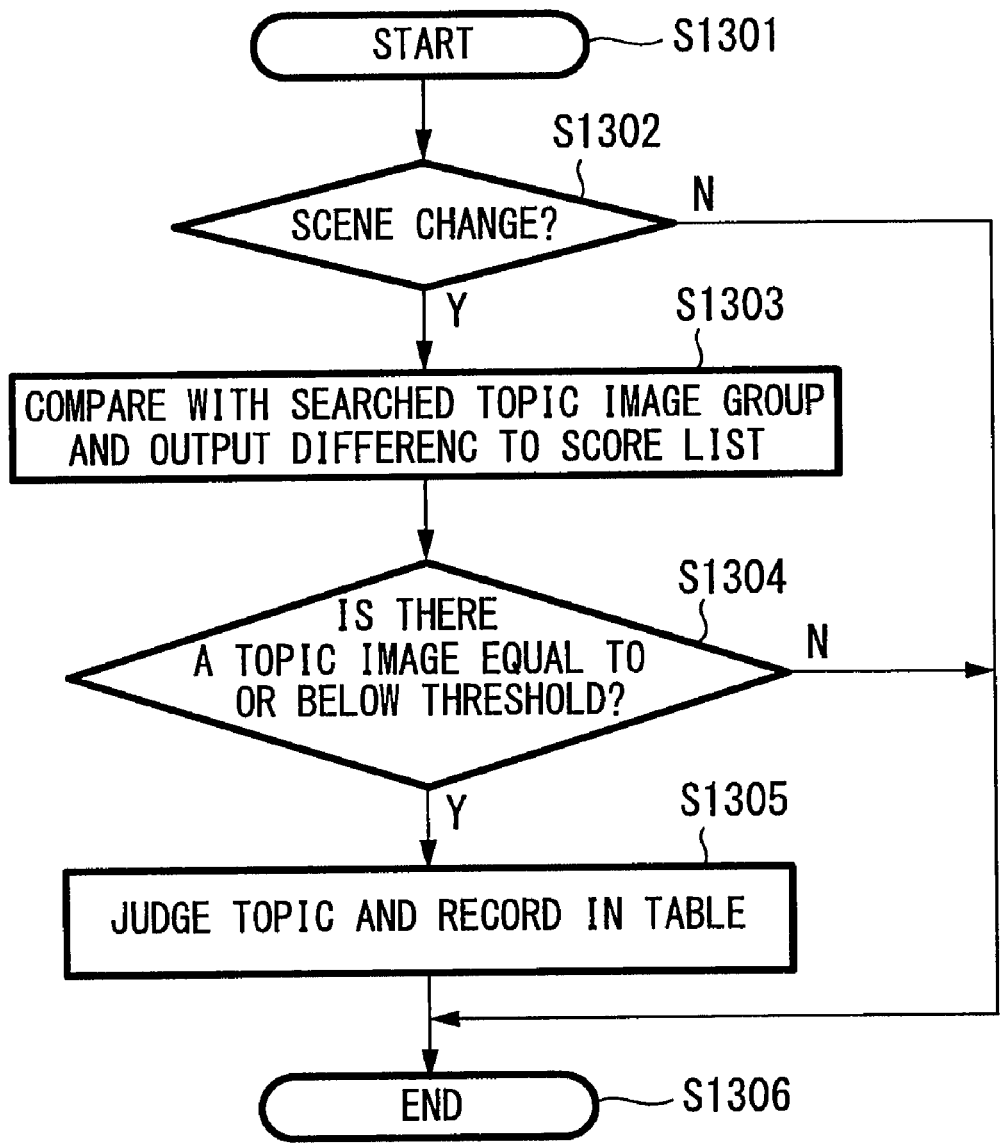
FIG. 13 is a flowchart showing the operation of the topic detecting unit.

FIG. 13 is a flowchart showing the operation of the topic detecting unit 305. This processing is carried out whenever frames that have been thinned by the frame thinning unit 502 are outputted. When the frame thinning unit 502 outputs one frame of video data (S1301), the scene change detecting unit 304 judges whether a scene change has occurred (S1302). When it is judged that a scene change has occurred and the judgment result is "true", the searching unit 1205 searches the topic image table 1204 with the channel information of an EPG as a search key and selects a topic image of the corresponding channel. The adder 1203 then generates the difference between the topic image data and the video data of the present frame and outputs the difference to the scorelist 1206 (S1303). The topic judging unit 1207 examines all of the data on differences (which is recorded in the scorelist 120) between the topic image data group and the video data in the present frame and checks whether topic image data of a predetermined threshold 1008 or lower is present (S1304). If such data is present, it is judged that a topic has been generated, the topic image data is outputted to the characteristic amount table 206 (S1305), and the processing is completed (S1306).

Note that when a scene change has not occurred, and the judgment result is "false" in either step S1302 or step S1304, no further processing is carried out. That is, the operation in step S1305 is not carried out.

Figure 14:
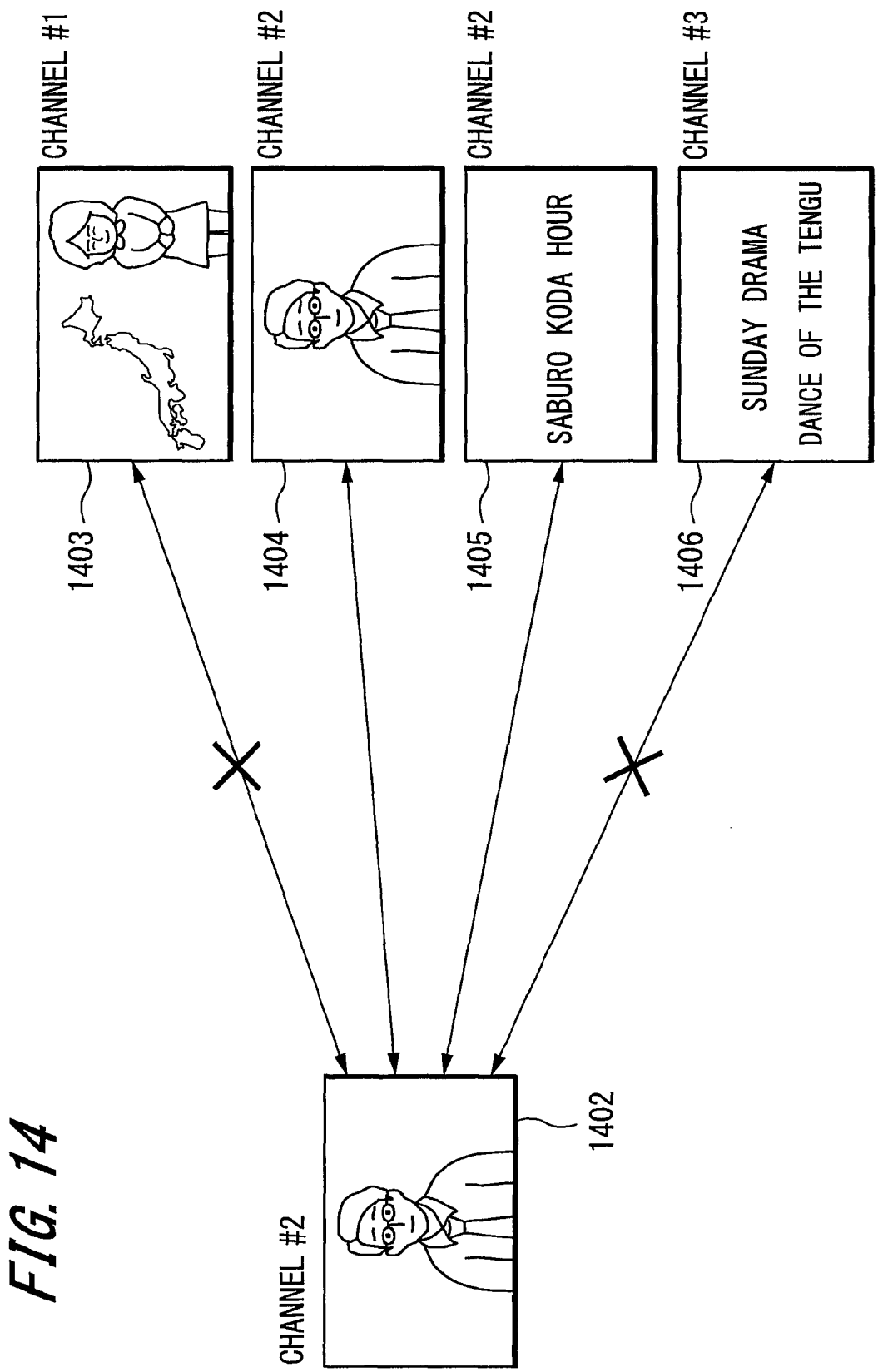
FIG. 14 is a schematic diagram useful in explaining the operation of a search unit and an adder.

FIG. 14 is a schematic diagram useful in explaining the operation of the searching unit 1205 and the adder 1203. In this figure, a news program is being received on channel #2. A still image of the program at this time is represented by image 1402. A topic image file for each program on each channel is stored in the topic image table 1204. The searching unit 1205 carries out a search for topic image files using the information "channel #2" and compares such image files with the video data of the frame presently being inputted. That is, in FIG. 14, the comparing of the topic image file 1403 of channel #1 and the topic image file 1406 of channel #3 is blocked by the searching unit 1205. After this, comparisons are carried out for the topic image files 1404 and 1405 of channel #2.

FIG. 15 shows one example of a characteristic amount table 206. In the tv 101 shown in FIG. 2, a characteristic amount table 206 is generated for each channel whenever a program is started and is discarded when the program ends. The characteristic amount tables 206 are generated for each of video files 403 of a program in the recording apparatus 401 shown in FIG. 4. Character strings showing the detection results of the program category information extracting unit 302, the subtitle detecting unit 303, the scene change detecting unit 304, and the topic detecting unit 305 that construct the characteristic amount detecting unit 205 shown in FIG. 3 are recorded in the characteristic fields of the characteristic amount tables 206.

"EPG_NEWS" is information used by the program category information extracting unit 302 to show a program category included in the EPG, and shows that the present program belongs to a "news program category". Aside from "EPG_NEWS", the character strings outputted from the program category information extracting unit 302 include character strings such as "EPG_SPORTS", "EPG_VARIETY", "EPG_DRAMA", and "EPG_CARTOON" in accordance with the program category.

"SUBTITLE" is a character string showing that a subtitle has been detected by the subtitle detecting unit 303. "SCENE_CHANGE" is a character string showing that a scene change has been detected by the scene change detecting unit 304. "TOPICS" is a character string showing that a topic has been detected by the topic detecting unit 305.

Sorting

Figure 16:
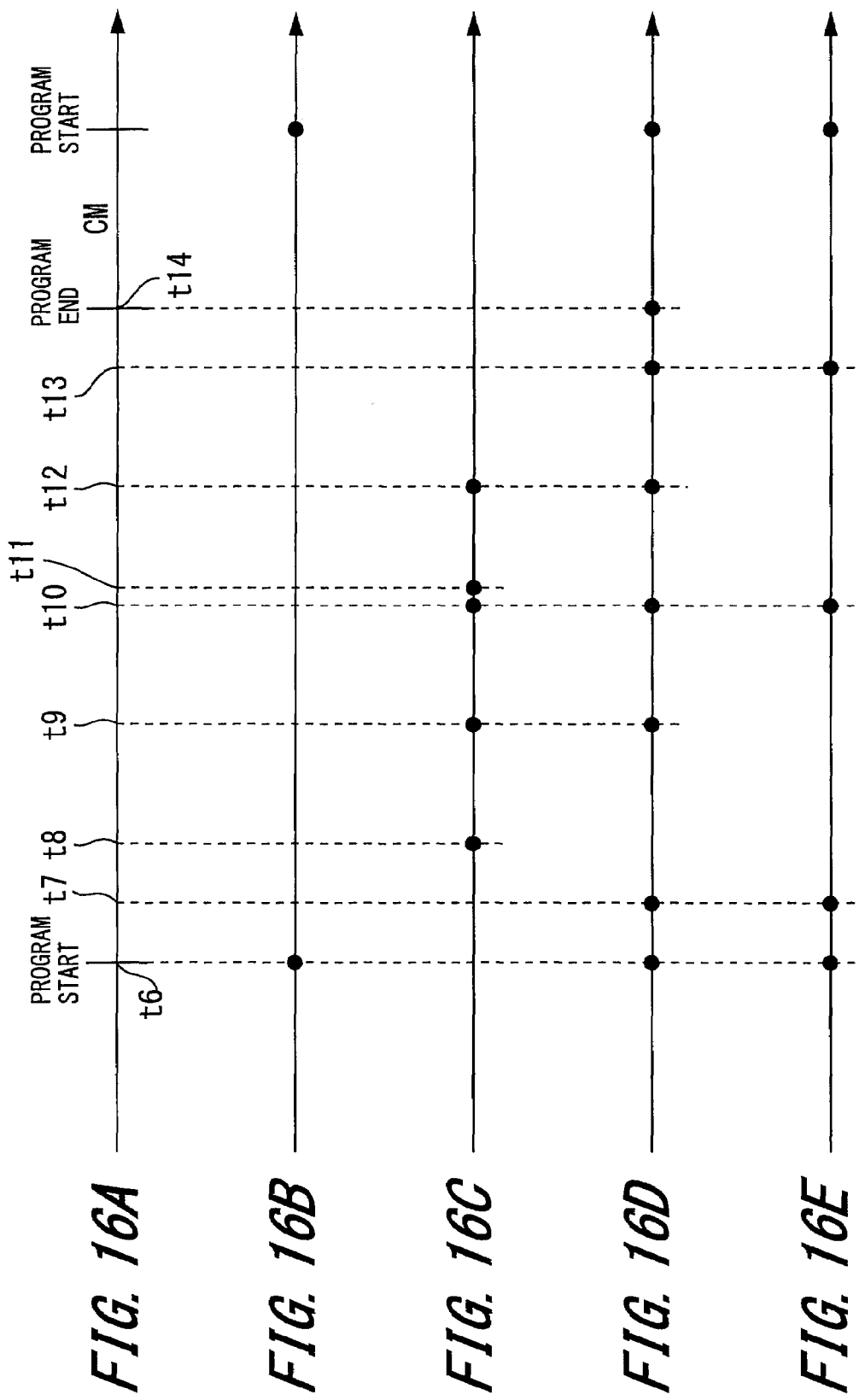
FIGS. 16A to 16E are charts schematically showing the flow of time from the start to the end of a program and the timing at which various characteristics that have been detected appear during the flow.

The operation of the sorting unit 207 will now be described with reference to FIGS. 16A to FIG. 17. FIGS. 16A to 16E are schematic diagrams showing the flow of time from the start of a program to the end and the timing of the appearance of the various characteristics detected from the start to the end of the program. FIG. 16A is a time chart showing the program composition, that is, the flow from the start to end of the program. FIG. 16B is a time chart showing the timing of the detection results of a program category produced by the program category information extracting unit 302. FIG. 16C is a time chart showing the timing of detection results of subtitles produced by the subtitle detecting unit 303. FIG. 16D is a time chart showing the timing of detection results for scene changes produced by the scene change detecting unit 304. FIG. 16E is a time chart showing the timing of topic detection results produced by the topic detecting unit 305.

At time t6, the program starts. Here, it is supposed that the program is a news program. The program category information extracting unit 302 detects the appearance of a program category at the same time as the program start and records "EPG_NEWS" in the characteristic amount table 206. At the same time, the scene change and topic for the opening image of the news program are detected by the scene change detecting unit 304 and the topic detecting unit 305 respectively. At time t7, when the scene showing the first news item is reached, the image changes from the opening screen to a screen where the newsreader is shown in closeup. In response, the scene change detecting unit 304 and the topic detecting unit 305 detect the scene change and topic, respectively. Soon afterward, when time t8 is reached, a subtitle included on the screen is detected by the subtitle detecting unit 303. At time t9, the screen changes from a state where the newsreader is shown to a state where a location is shown and together with this, the subtitle also changes. This is detected by the subtitle detecting unit 303 and the scene change detecting unit 304.

At time t10, when the scene where the next news item is reached, the screen changes from the on-location images to the state where the upper body of the newsreader is displayed in closeup on the screen. In response, the scene change detecting unit 304 and the topic detecting unit 305 detect the scene change and topic, respectively. Soon after this, when time t11 is reached, any subtitles on the screen are detected by the subtitle detecting unit 303. At time t12, the screen switches from the state where the newsreader is shown to the state where on-location images are shown and the subtitle also changes. This is detected by the subtitle detecting unit 303 and the scene change detecting unit 304. At time t13, when a scene informing the user of the end of the program is reached, the screen switches from the on-location images to the state where the newsreader is shown in closeup. In response to this, the scene change detecting unit 304 and the topic detecting unit 305 detect the scene change and topic, respectively. At time t14, when the program ends, the broadcast switches to commercials (hereinafter, CM). In response, the scene change detecting unit 304 detects a scene change.

As can be seen in FIG. 16, it is possible to obtain the average appearance frequency of various characteristic amounts that appear in the program with highest accuracy once the program has ended, and such number will be incorrect immediately after the program starts. It is therefore necessary for the sorting unit 207 to carry out the sorting process for the channel display order of the multiscreen with consideration to this situation.

Figure 17:
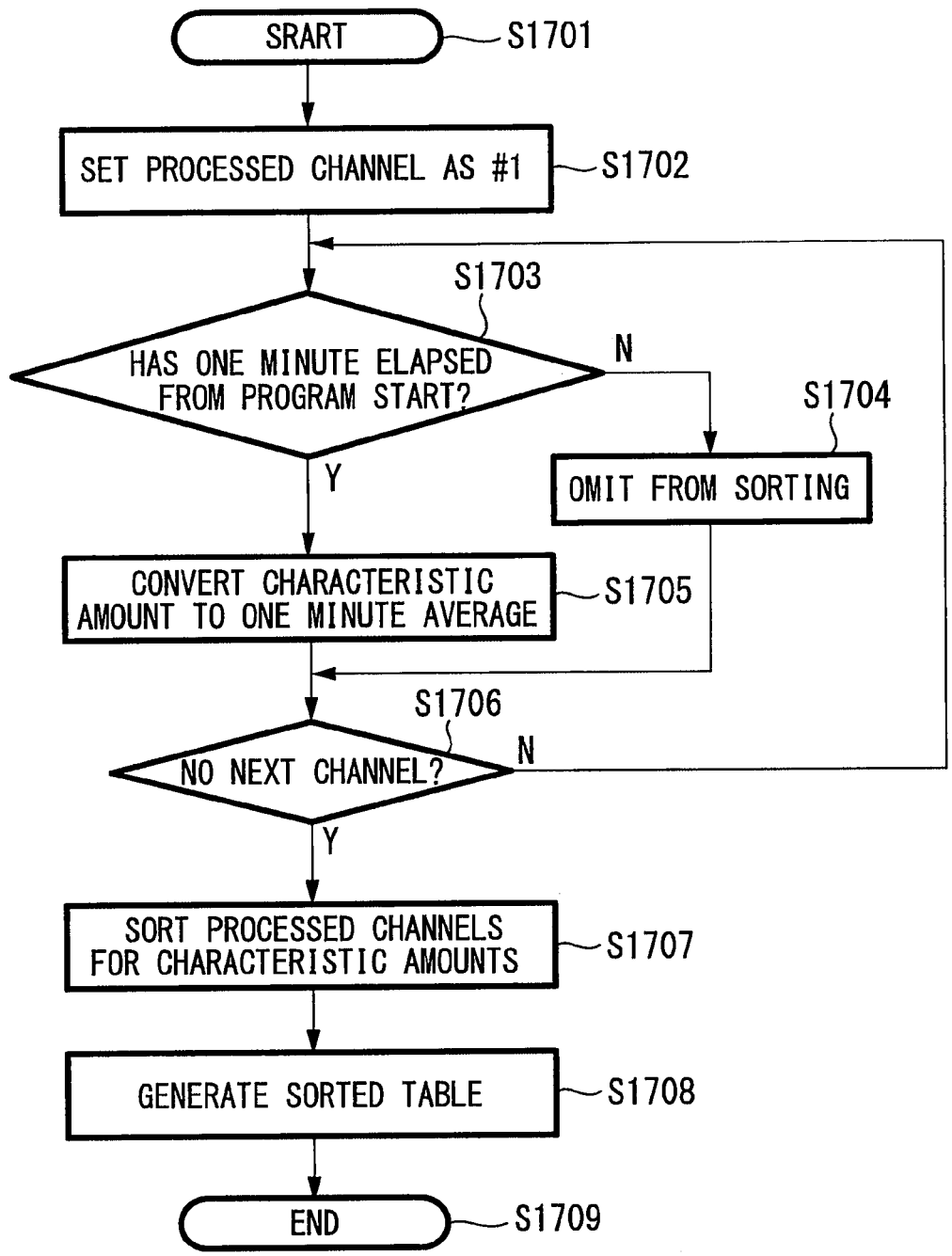
FIG. 17 is a flowchart showing the processing of a sorting unit.

FIG. 17 is a flowchart showing the processing of the sorting unit 207. The processing of the sorting unit 207 is carried out whenever the characteristic amount detecting unit 205 additionally records characteristic amount data in a characteristic amount table 206. Note that to prevent processes from unnecessarily being carried out in parallel, it is possible to use a countermeasure such as setting the interval between processes at one second or longer. When the processing starts (S1701), the first channel to be processed is set as number one (S1702).

After this, a loop process is carried out. First, for the program on the channel currently in focus, it is confirmed whether the present time is one minute after the start of the program (S1703). This is carried out because it is difficult to obtain a reliable sorting result for the characteristic amount appearance frequency until one minute has passed from the start of the program. When one minute has not passed, the present program is omitted from the sorting (S1704). When one minute has passed, the respective characteristic amounts recorded in the characteristic amount table 206 are converted to averages for one minute (S1705).

Next, it is confirmed whether there are no more channels to be processed (S1706). If there are, the processing from step S1703 onward is repeated again. If there are no more channels to be processed, the processed channels are sorted for the respective characteristic amount averages (S1707), a list is generated (S1708), and the processing is completed (S1709).

Due to the sorting unit 207 operating in this way, in the tuner unit 201 shown in FIG. 2, whenever any of the characteristics described above is found for any of the "tuner #1" 204a to "tuner #9" 204i, the sorting process by the sorting unit 207 is carried out again to produce an order that is always up-to-date. When the button of the remote 103 is operated to call up a multiscreen of an arbitrary order, a multiscreen is displayed with the latest order for the time at which the button was pressed. If the user wishes to view the multiscreen again and presses the same button once more, the channels are sorted into the latest order at that point, and the displaying of a multiscreen is carried out again.

Note that in step S1703, the process that waits for one minute from the start of a program does not necessarily have to wait for one minute. Since this is merely a design decision, the waiting period can be changed within a range where there is no loss in user convenience. Also, it is possible to use a construction where the waiting period can be arbitrarily changed by the user.

The following applications are conceivable for the present embodiment.

(1) It is possible to use a CM detection function of the topic detecting unit 305 in place of the scene change detecting unit 304 in FIG. 12.

(2) Although the characteristic amount detecting unit 205 operates constantly during the reception of broadcasts in the tuner unit 201 of the present embodiment, it is also possible to use a construction where the characteristic amount detecting unit 205 starts operating at a point where the user operates the remote 103 and the sorting unit 207 operates around one minute or longer thereafter.

(3) The tuner unit 201 and the recording apparatus 401 according to the above embodiment can also be realized by a program that is inputted into and executed by a personal computer equipped with a television tuner.

(4) The tuner unit 201 and the recording apparatus 401 according to the present embodiment may be integrated with an optical disc player, characteristic amounts may be detected for video recorded on an optical disc, and the video may be sorted together with the characteristic amounts of television broadcasts.

(5) Although the tv 101 is constructed of a single LCD display 102 in FIG. 1, it is possible to use a construction where a plurality of LCD displays are laid out. That is, for the example in FIG. 1, nine LCD displays may be laid out horizontally and vertically as shown in FIG. 1. In this case, the multiscreen generating unit 209 is equipped with a matrix switcher function where different video signals are transmitted to the nine LCD displays laid out horizontally and vertically.

In the present embodiment, a television receiver is disclosed. According to the television receiver according to the present embodiment, it is possible to realize a video signal generating apparatus for a television receiver that is capable of displaying a multiscreen in a variety of orders in accordance with the user's preferences.

Although the present invention has been described by way of the above embodiments, the present invention is not limited to such embodiments and it should be obvious that various modifications and applications can be made without departing from the scope of the invention disclosed in the appended claims. For example, although an example where a plurality of television broadcasts (i.e., a plurality of channels) are simultaneously displayed as a multiscreen has been described in the above embodiment, it is possible to apply the present invention to a process that simultaneously displays a plurality of other image contents as a multiscreen. An image display apparatus that displays images may be constructed to display a multiscreen by dividing a single display screen or may be constructed to display the screens that compose the multiscreen on separate image display apparatuses that are laid out together.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal generating apparatus comprising:
   a video information obtaining unit configured to obtain video information from a plurality of channels;
   a characteristic information obtaining unit configured to obtain a plurality of predetermined characteristic information from the video information of each channel, and to detect a change in the characteristic information obtained from the video information;
   a sorting unit configured to generate a display order of the video information of each channel in order of a frequency of changes in the characteristic information; and
   a display image signal generating unit configured to generate a video signal to display, via a display screen of a display device, the video information of each channel in an order based on the display order determined by the sorting unit.

2. An image signal generating apparatus according to claim 1, wherein the characteristic information obtaining unit detects subtitles in the video information.

3. An image signal generating apparatus according to claim 1, wherein the characteristic information obtaining unit detects scene changes in the video information.

4. The image signal generating apparatus according to claim 3, wherein the characteristic information obtaining unit detects a scene change in the video information by calculating a difference value between video information of a current frame with video information of a preceding frame and determining whether the difference value exceeds a predetermined threshold value.

5. The image signal generating apparatus according to claim 4, wherein the sorting unit changes the display order based on the frequency of the detected scene changes.

6. An image signal generating apparatus according to claim 1, wherein the characteristic information obtaining unit detects similarity with one of the plurality of video information stored in advance.

7. An image signal generating apparatus according to claim 1, wherein
   the characteristic information obtaining unit obtains information showing a content of the video information, and
   the sorting unit changes the display order based on the information showing the content of the video information.

8. An image signal generating apparatus according to claim 1, wherein the video signal generating unit generates a video signal to display a plurality of display regions on the display screen.

9. The image signal generating apparatus according to claim 8, wherein
   each display region contains video information from a different channel of the plurality of channels, and
   the display regions are displayed in an order based on the display order.

10. An image signal generating apparatus according to claim 1, wherein the video signal generating unit separately distributes video signals to a plurality of display screens to form a multiscreen.

11. The image signal generating apparatus according to claim 1, further comprising:
    a frame thinning unit configured to reduce a frame rate and resolution of the video information of each channel before the characteristic information obtaining unit obtains the plurality of predetermined characteristic information.

12. The image signal generating apparatus according to claim 1, wherein the characteristic information obtaining unit detects subtitles in response to the subtitle being visible in the video information for a predetermined period of time.

13. The image signal generating apparatus according to claim 12, wherein the sorting unit changes the display order based on the frequency of the appearances of subtitles.

14. An image signal generating method implemented by an image signal generating apparatus comprising:
    obtaining a video information from a plurality of channels;
    obtaining various characteristic information from the video information of each channel;
    detecting a change in the characteristic information obtained from the video information;
    generating a display order of the video information of each channel in order of a frequency of changes in the characteristic information; and
    generating a video signal to display, via a display screen of a display device, the video information of each channel in an order based on the display order.

15. A non-transitory computer-readable medium storing computer-readable instructions thereon which when executed by a image signal generating apparatus cause the image signal generating apparatus to perform a method comprising:
    obtaining video information from a plurality of channels;
    obtaining various characteristic information from the video information of each channel;
    detecting a change in the characteristic information obtained from the video information;
    changing a display order of the video information of each channel in order of a frequency of changes in the characteristic information; and
    generating a video signal to display the video information of each channel in an order based on the display order.

* * * * *